No. 726,481. PATENTED APR. 28, 1903.
S. H. TINSMAN.
DRAFT APPLIANCE.
APPLICATION FILED SEPT. 18, 1902.
NO MODEL.
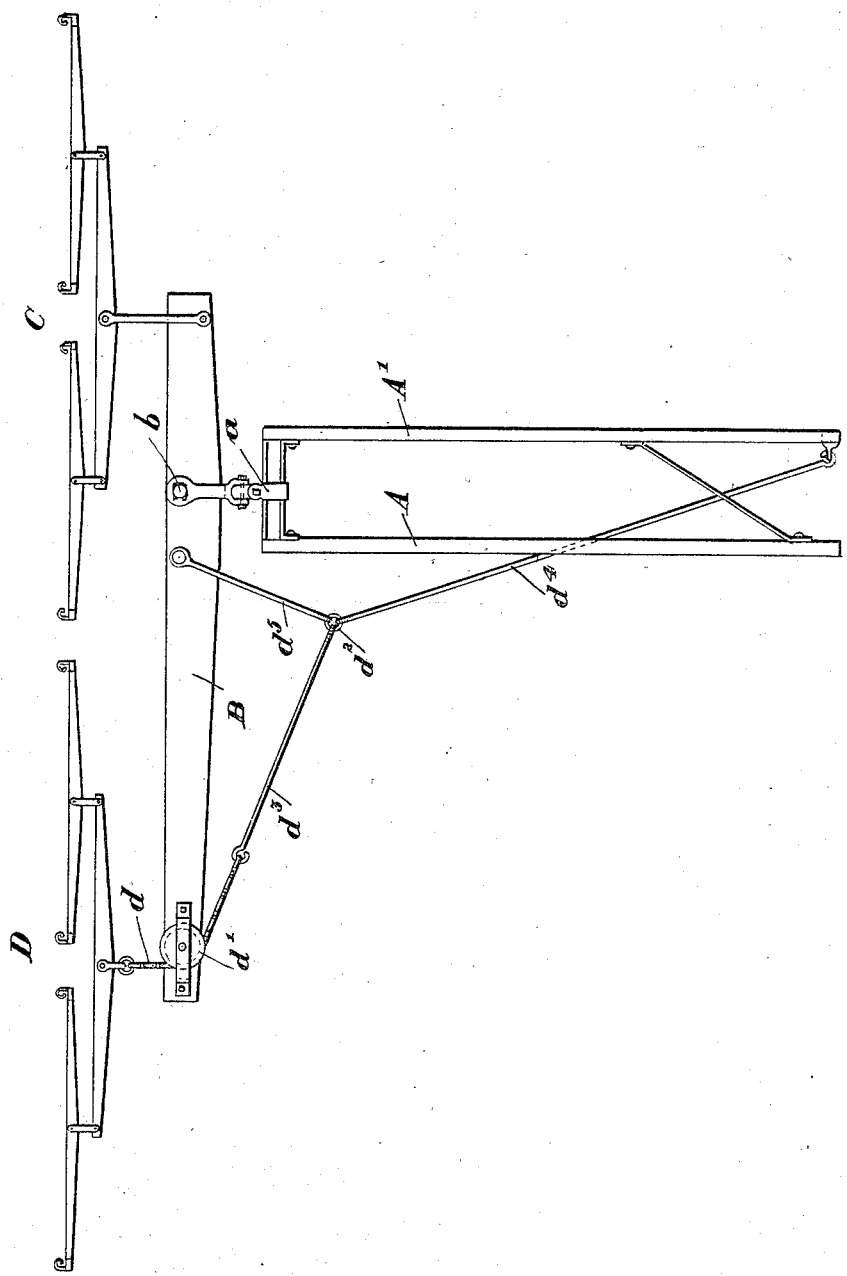
Witnesses:
Arthur F. Durand
O. M. Wernick
Inventor:
Samuel H. Tinsman
By Chas. C. Bulkley
Atty.

UNITED STATES PATENT OFFICE.

SAMUEL H. TINSMAN, OF MORRIS, ILLINOIS.

DRAFT APPLIANCE.

SPECIFICATION forming part of Letters Patent No. 726,481, dated April 28, 1903.

Application filed September 18, 1902. Serial No. 123,820. (No model.)

*To all whom it may concern:*

Be it known that I, SAMUEL H. TINSMAN, a citizen of the United States of America, and a resident of Morris, Grundy county, Illinois, have invented a certain new and useful Improvement in Draft Appliances, of which the following is a specification.

My invention relates to draft appliances in general, but more particularly to the evener arrangements for connecting horses or other draft-animals with plow and other like implements, and especially to a four-horse-evener arrangement for drawing a tandem or a gang plow.

Prior to my invention a great many arrangements have been proposed for obtaining an even distribution of draft with a laterally-displaced evener-bar. Obviously with an evener-bar laterally displaced or arranged off center the draft is unevenly distributed and the horses hitched to the long end of the bar have a decided advantage over those hitched to the other end of the bar, provided, of course, that no provision is made to the contrary. Now, as stated, a great many arrangements have been proposed for overcoming this difficulty and for insuring an even distribution of the draft with an off-center arrangement of this character, and of course in each instance an attempt has been made to prevent the horses attached to the long end of the bar from having any advantage over those attached to the other end; but in each case, so far as I am aware, these different arrangements have fallen short of their object and have only succeeded in partially overcoming the difficulty. In some of these prior devices the draft has been very unequal, and in each and every case the horses at the long end of the bar have had some advantage over those at the short end.

Now the object of my invention, generally stated, is to reduce this tendency toward an unequal distribution of the draft to a minimum. In other words, the object of my invention is to provide an arrangement in which the horses at the long end of the evener-bar shall have as little advantage as possible over the horses at the short end of the bar—that is to say, I aim to eliminate side draft as much as possible and to reduce whatever advantage the horses at one side may have over those at the other to a minimum.

It is also an object of my invention to provide certain details and features of improvement tending to increase the general efficiency and serviceability of a draft appliance of this particular character.

To the foregoing and other useful ends my invention consists in matters hereinafter set forth and claimed.

In the accompanying drawing the figure is a plan of a four-horse-evener arrangement embodying the principles of my invention and showing its application to the draft appliances for drawing a gang-plow.

As thus illustrated, A and A' indicate the beams of plows of any suitable known or approved character. The evener-bar or frame B is pivotally connected at $b$ with the forward ends of the plow-beams. With this arrangement it will be seen that the said evener B is attached "off center," so to speak, the horses at one side having the long end of the bar, while the horses at the other or right-hand side are connected with the short end. The two evener and whiffletree arrangements C and D can be of any suitable form or character. As shown, each one is a two-horse arrangement, and thus the appliance in its enirety is a four-horse-evener arrangement for drawing the plows. The evener and whiffletree device C can be pivotally connected to the short end of the evener-bar or frame B in any suitable manner. In order to practically equalize the draft, however, the evener and whiffletree arrangement D has a running or variable connection with the long end of the evener-bar B, preferably through the medium of the chain $d$ and the sheave $d'$. The said chain is preferably connected with the ring $d^2$ by means of the draft-rod $d^3$ and ultimately with the beam A' through the medium of the draft-rod $d^4$. In order to reduce to a minimum the increased leverage which the horses of the draft device D have or would have by reason of the off-center arrangement of the evener or equalizer B, the ring $d^2$ is preferably connected with the bar B by means of the connection $d^5$. In this way the horses at the left have only a running connection with the main evener-bar B, but have a direct draft connection with the plow-beam, and in addition part of the draft of the horses at this side is converted into a back pull on the long end of the bar B, so as to, as stated, practically equalize the draft. In other words, the back pull thus thrown upon the long end of the evener is sufficient to practically counteract the advantage of increased leverage which the horses at the left might have over those at the right by reason of the off-center arrangement of the evener. In this way when the horses at each side are pulling ahead in the usual way the result is practically the same as though the evener were attached at its center, as far as the draft of the two teams is concerned, and it will of course be readily understood that the back pull upon the long end of the evener-bar is exerted from a point on the plow or other object to be drawn—as, for example, the point at which the draft-rod $d^4$ is attached to the plow-beam A'. In other words, the back pull is sustained by some sort of a draft connection which is connected with the object to be drawn and is exerted in such manner as to, as previously explained, practically equalize the draft and prevent side draft. Hence the arrangement permits the horses and the draft appliance in its entirety to be shifted laterally relatively to the plow, so as to secure the well-known advantage of such an arrangement with respect to certain kinds of work without giving the horses at one side any very great advantage over those at the other side. Furthermore, the draft is to all practical purposes evenly and properly distributed over the plow-beams, the plows are held in place, and the horses pull in a straight line. Any number of horses may be employed, and I do not limit myself to the exact construction shown and described.

With an arrangement embodying the principles of my invention it will be seen that I provide an evener which not only equalizes the draft—that is to say, which equalizes the draft as much as it is possible to—but which will also reduce the tendency of side draft to a minimum. It is obvious that various arrangements can be employed for converting a portion of the draft of either team into a back pull on the long end of the evener.

What I claim as my invention is—

1. A plow-beam, an off-center evener-bar connected with the forward end of said beam, a draft device connected with the short end of said bar, a sheave on the long end of said bar, a flexible connection connected with the said beam and extending around said sheave, another draft device connected with said flexible connection, and a connection between the said flexible connection and the evener-bar for converting a portion of the draft of the horses attached to said last-mentioned draft device into a back pull upon the long end of said bar.

2. A plow-beam, an evener-bar having an off-center connection with said beam, a draft device having a running connection with the long end of said bar and a positive connection with said beam, a connection adapted and arranged to convert a portion of the draft of the horses attached to said draft device into a back pull upon the long end of said bar, and another draft device attached to the short end of said bar.

3. The combination of a pivoted off-center evener, a flexible connection having one end secured to the load and the other end secured to the longer portion of said evener, draft devices at each end of said evener, a sheave at one end of said evener, and a second flexible connection extending around said sheave and having one end secured to one of said devices and having the other end secured to an intermediate portion of said first-mentioned flexible connection.

4. A draft-equalizer comprising an evener-bar having an off-center pivotal connection with the object to be drawn, a supplemental flexible connection extending between the object to be drawn and a point on the longer end portion of said evener, a suitable draft device having a positive connection with the shorter end portion of said evener-bar, a sheave mounted at the end of the longer end portion of said evener-bar, another draft device associated with the longer end portion of said evener-bar, and a flexible draft connection extending around said sheave and connecting said last-mentioned draft device with an intermediate portion of said supplemental draft connection.

5. A draft-equalizer comprising an evener-bar having an off-center pivotal connection with the object to be drawn, a supplemental flexible connection extending between the object to be drawn and a point on the longer end portion of said evener, a suitable draft device having suitable connection with the shorter end portion of said evener-bar, a flexible draft connection having a positive connection with an intermediate portion of said supplemental flexible connection, and having a running connection with the outer end of the longer end portion of said evener-bar, and another draft device connected with the forward end of said flexible draft connection.

6. In combination, in a draft-equalizer, a pivoted off-center evener-bar, a draft device having a positive connection with the short end of said bar, another draft device associated with the long end of said bar, and flexible draft connections adapted to connect said last-mentioned device with the load at a point to the rear of the connection between the latter and the evener-bar, said flexible draft connections having two intermediate points of connection with the long end of said bar.

7. In combination, in a draft-equalizer, a pivoted off-center evener-bar, a draft device having a positive connection with the short end of said bar, another draft device associated with the long end of said bar, and flexible connections extending between said last-mentioned device and an intermediate point on the long end portion of said bar, said point being located near the pivotal point of said bar.

8. In combination, in a draft-equalizer, a pivoted off-center evener-bar, a draft device having a positive connection with the short end of said bar, another draft device associated with the long end of said bar, flexible connections adapted to connect the said last-mentioned device with the object to be drawn at a point in rear of the latter's connection with the evener-bar, a sheave mounted at the end of the long end portion of said evener-bar and engaging a portion of said flexible connections, and a connection extending between an intermediate portion of said flexible connections and an intermediate point on the long end portion of said bar.

9. In combination, in a draft-equalizer, an evener-bar having its attaching-point to one side of the center of draft, draft devices at each end of said evener-bar, a positive connection between one of said devices and the short end of said evener-bar, and direct draft connections between the other device and the object to be drawn, said draft connection being positively connected with the object to be drawn at a point in rear of the latter's connection with the evener-bar, and said draft connections having a running connection with the end of said evener-bar.

10. In combination, in a draft-equalizer, an evener-bar adapted to have a load connected thereto at one side of the center of draft, draft devices located at each end of said evener-bar, a connection between one of the devices and the short end of the evener-bar, and flexible draft connections secured at one end to the load and connected at the other end to said other draft device, said flexible connections having both a running and a positive intermediate connection with the long end portion of said evener-bar.

Signed by me at Morris, Illinois, this 16th day of September, 1902.

SAMUEL H. TINSMAN.

Witnesses:
E. L. CLOVER,
FRANK H. REED.